A. KIMBLE.
METHOD OF MAKING DYNAMO-ELECTRIC MACHINES.
APPLICATION FILED JULY 24, 1920.
1,408,890.
Patented Mar. 7, 1922.
2 SHEETS—SHEET 1.
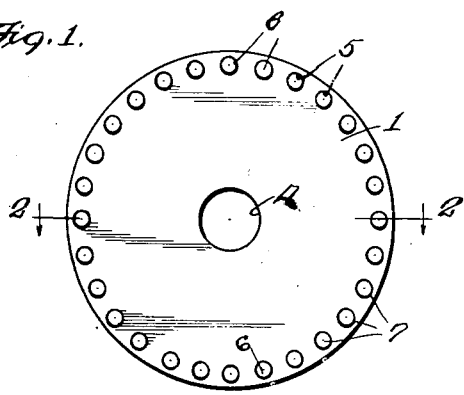
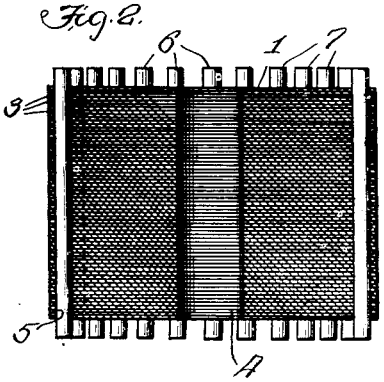
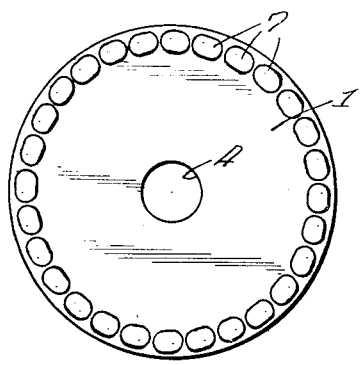
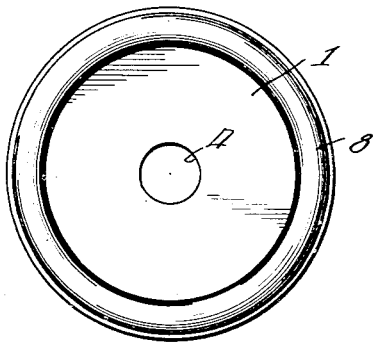
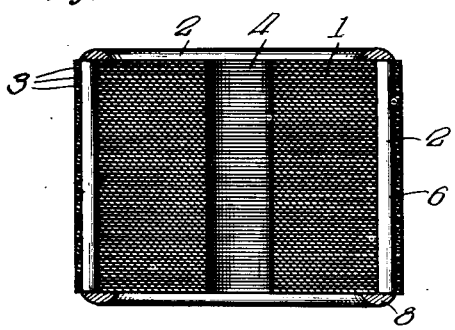
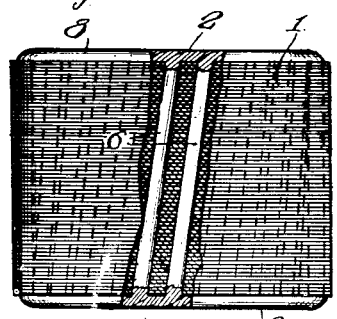
Witnesses:
Inventor:
Austin Kimble
By Rummler & Rummler
Attys.

A. KIMBLE.
METHOD OF MAKING DYNAMO-ELECTRIC MACHINES.
APPLICATION FILED JULY 24, 1920.
1,408,890. Patented Mar. 7, 1922.
2 SHEETS—SHEET 2.
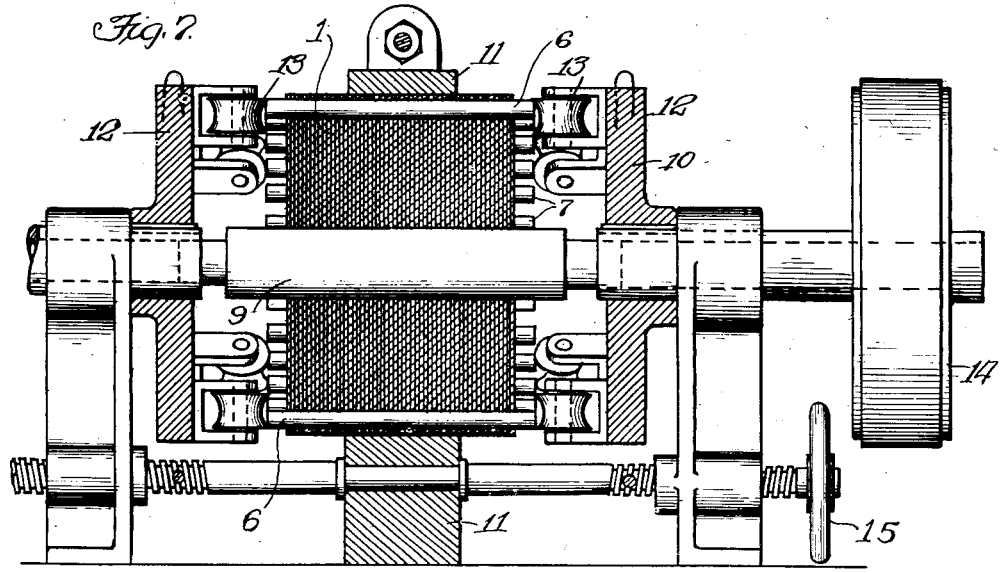
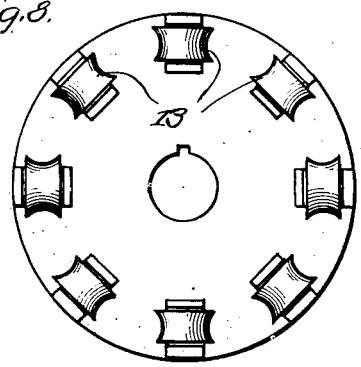
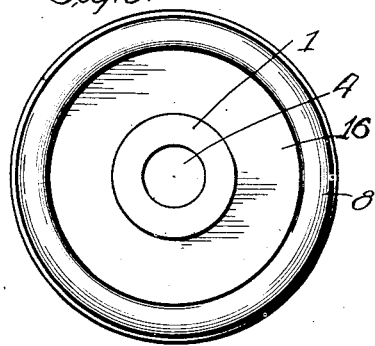
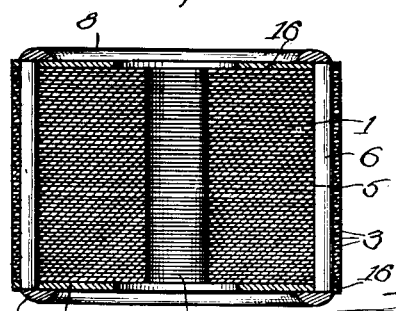
Witnesses:
Inventor:
Austin Kimble,

UNITED STATES PATENT OFFICE.

AUSTIN KIMBLE, OF WAUSAU, WISCONSIN.

METHOD OF MAKING DYNAMO-ELECTRIC MACHINES.

1,408,890.  Specification of Letters Patent.  Patented Mar. 7, 1922.

Application filed July 24, 1920. Serial No. 398,728.

*To all whom it may concern:*

Be it known that I, AUSTIN KIMBLE, a citizen of the United States of America, and a resident of Wausau, county of Marathon, State of Wisconsin, have invented certain new and useful Improvements in Methods of Making Dynamo-Electric Machines, of which the following is a specification.

This invention relates to dynamo-electric machines and especially to squirrel cage motors. The main objects of the invention are to provide an improved form of squirrel cage winding and combination thereof with a supporting core; to provide an improved method of forming squirrel cage structures, especially the end rings; and to provide a simplified method of effecting the desired skew for the slots and inductor bars.

An illustrative embodiment of this invention is shown in the accompanying drawings in which—

Fig. 1 is an end view of an unfinished rotor showing the inductor bars in the core slots, but with the end rings not yet formed.

Fig. 2 is a section at the line 2—2 on Fig. 1.

Fig. 3 is similar to Fig. 1 except that it shows the rotor after the projecting ends of the inductor bars have been bent or rolled over somewhat in the process of forming the end rings.

Fig. 4 is similar to Figs. 1 and 3 except that it shows the rotor in its finished form with the bar tips overlapping and rolled together and positively secured and protected by a dip coating of solder or the like to form an end ring.

Fig. 5 is a section similar to Fig. 2 except that a finished rotor is shown.

Fig. 6 is a side view of a finished rotor with part of the surface metal cut away to show the skew of the inductor bars and their substantially integral connection at the ends.

Fig. 7 is mainly an axial section at 7—7 on Fig. 8, showing a forming machine for skewing the bars and rolling down the bar ends.

Fig. 8 is a face view of one of the roller bearing disks of the forming machine.

Fig. 9 is an end view of a modified form of rotor having punched end rings disposed against the core ends in combination with rings rolled from the bar ends as in Fig. 4.

Fig. 10 is an axial section of the rotor shown in Fig. 9.

In the construction shown in the drawings, the laminated core 1 is provided with a squirrel cage winding 2. Each of the core disks 3 is provided with a central shaft aperture 4 and a peripheral series of holes or slots 5.

The squirrel cage winding comprises a series of inductor bars 6 disposed skew-wise in the slots 5, said bars having their ends 7 bent over and rolled down tightly, all in the same direction and mutually overlapping to provide end rings 8.

The method of carrying out my invention is as follows: A stack of core disks are assembled on a shaft 9, the ends of which project for support at both ends of the core as shown in Fig. 7. The said disks are initially arranged with their winding apertures in alinement to form slots parallel with the shaft. The inductor bars 6 are then placed in the slots 5 with their ends projecting somewhat and with said bars fitting snugly in said slots. This assemblage of parts is then placed in a forming machine 10 where it is held stationarily as by a clamp 11 engaging the core body, and where a pair of end frames or plates 12 provided with rollers 13 are pressed against the ends of the core. The said plates 12 are then simultaneously rotated in opposite directions as by power means 14 and are gradually forced convergently as by means 15, whereby the rollers are pressed tightly against the bar ends 7 thereby forcing them over against the ends of the core and against one another so as to overlap. This rolling process is continued until the bar ends are forged or spun down smoothly and uniformly to produce end rings 8. In this rolling process the mechanical resistance offered by the projecting bar tips is sufficient to cause the laminations to slip and skew somewhat as a result of the twisting force, so that the slots and bars are skewed sufficiently to comply with the usual requirements in this respect, namely, to prevent humming. Automatic means not shown are provided to stop the advance of the end plates 12 at a predetermined point, so as to insure end rings of uniform character.

The precise form and disposition of the rings 8 is dependent on the shape of the forming rollers 13. Preferably said rollers are formed and positioned to crowd the ring metal inward somewhat toward the shaft axis, as shown in Fig. 5.

After the rolling is finished the ring parts may to advantage be dipped in hot metal, as for instance solder, in order to more securely hold the set of the ring overlaps.

In the embodiments shown in Figs. 1 to 7 inclusive the said ends 7 are disposed directly against the ends of core 1, but in Figs. 9 and 10 a pair of punched sheet metal rings 16 are disposed between the core and the rolled or spun rings 8 and are clamped tightly in place thereby. The skew of the inductor bars is effected in this instance in the same manner as for rotors in which the rings 15 are omitted.

As will be apparent, the preferred simple form of Fig. 5 may be made very efficiently respecting labor and materials. Punched end rings being omitted there is no waste of copper. The capacity of the end rings may be adjusted by cutting the bars 6 of appropriate length. The rolling process results in a very uniform and dependable product.

Although two specific embodiments of this invention are herewith shown and described, it is to be understood that some of the details of the structure and method of forming same may be omitted or altered without departing from the spirit of this invention as defined by the following claims.

I claim:

1. The method of forming a skewed squirrel cage winding and applying the same to its supporting core, which consists in placing inductor bars of greater length than the core in the slots of an unskewed core and then simultaneously, at both ends but in opposite directions respectively, bending over the projecting tips of the bars to consecutively overlap one another in continuous succession at each end, the core being thereby twisted sufficiently to skew the slots, and end rings also being thereby formed.

2. The method of forming dynamo-electric machine parts which consists in assembling a stack of centrally perforated core disks on a shaft with their slots in alinement parallel with the shaft, placing malleable conductor bars in the slots with their ends projecting, and then causing rollers to move circularly and simultaneously but in opposite directions about the ends of the core stack in alinement with said bars, whereby the core is skewed, and with sufficient inward pressure to snugly pack the core disks, and to bend over and mutually overlap the bar ends and thereby clamp said disks permanently and also form end rings.

3. A method of forming dynamo-electric machine parts which consists in assembling a stack of centrally perforated core disks on a shaft with their slots in alinement parallel with the shaft, placing malleable conductor bars in the slots with their ends projecting, clamping said assembled parts upon a suitable frame, and then causing rollers to move circularly and simultaneously about the ends of the core stack in alinement with said bars and with sufficient pressure toward each other to snugly pack the core disks and bend over and mutually overlap the bar ends and thereby clamp said disks permanently and also form end rings.

Signed at Wausau this 19th day of July, 1920.

AUSTIN KIMBLE.